US012086760B2

(12) United States Patent
Kreis et al.

(10) Patent No.: US 12,086,760 B2
(45) Date of Patent: Sep. 10, 2024

(54) SYSTEMS AND METHODS FOR DYNAMIC MANAGEMENT OF CONSOLIDATION ORDERS

(71) Applicant: Ocado Innovation Limited, Hatfield (GB)

(72) Inventors: Jeff Kreis, Wolfeboro, NH (US); Alexa Mellon, Cambridge, MA (US)

(73) Assignee: Ocado Innovation Limited, Hatfield (GB)

( * ) Notice: Subject to any disclaimer, the term of this patent is extended or adjusted under 35 U.S.C. 154(b) by 0 days.

(21) Appl. No.: 17/378,406

(22) Filed: Jul. 16, 2021

(65) Prior Publication Data

US 2022/0405697 A1    Dec. 22, 2022

Related U.S. Application Data

(60) Provisional application No. 63/211,479, filed on Jun. 16, 2021.

(51) Int. Cl.
*G06Q 10/087*    (2023.01)
*B65B 5/10*    (2006.01)
(Continued)

(52) U.S. Cl.
CPC ............ *G06Q 10/087* (2013.01); *B65B 5/10* (2013.01); *B65B 65/02* (2013.01); *G06Q 10/08* (2013.01)

(58) Field of Classification Search
CPC .... G06Q 10/087; G06Q 50/28; G06Q 20/203; G06Q 30/0223; G06Q 10/06;
(Continued)

(56) References Cited

U.S. PATENT DOCUMENTS 4,894,908 A    1/1990    Haba, Jr. et al.
5,412,576 A    5/1995    Hansen
(Continued)

FOREIGN PATENT DOCUMENTS

WO    WO-2019217420 A1 *    11/2019    ..... G06Q 10/063114
WO    WO-2020257389 A1 *    12/2020

OTHER PUBLICATIONS

United States Patent and Trademark Office, "Non-Final Office Action," issued in connection with U.S. Appl. No. 17/378,460, dated Jul. 27, 2022, 13 pages.
(Continued)

*Primary Examiner* — Fahd A Obeid
*Assistant Examiner* — Avia Salman
(74) *Attorney, Agent, or Firm* — Hanley, Flight & Zimmerman, LLC

(57) ABSTRACT

Systems and methods for managing consolidated orders in a fulfillment center are described herein. The example systems can be configured to receive an exception when an item associated with a consolidated order cannot be collected. Subsequently, when the example systems determine that the item can be collected, the example systems can consider different factors in creating a job to collect the item. The different factors can include a shipping cutoff time, a size of the item, a capacity of a storage container used in collecting the item, and the size, location, and availability of other items to be collected for the consolidated order.

19 Claims, 8 Drawing Sheets

(51) Int. Cl.
*B65B 65/02* (2006.01)
*G06Q 10/08* (2024.01)

(58) Field of Classification Search
CPC .............. G06Q 10/08; G06Q 10/0835; G06Q 10/0838; G06Q 10/0875; G08B 13/2462; G06K 2017/0051; Y04S 10/56; Y10S 707/949; G05B 19/4183; B65B 5/10; B65B 65/02; B65B 2210/04; B65B 5/12
See application file for complete search history.

(56) References Cited

U.S. PATENT DOCUMENTS

| | | | |
|---|---|---|---|
| 5,953,707 | A | 9/1999 | Huang et al. |
| 6,119,102 | A | 9/2000 | Rush et al. |
| 6,151,582 | A | 11/2000 | Huang et al. |
| 6,847,858 | B2 | 1/2005 | Arnold et al. |
| 7,532,947 | B2 | 5/2009 | Waddington et al. |
| 7,747,340 | B2 | 6/2010 | Jones |
| 8,024,237 | B1 | 9/2011 | Davidson et al. |
| 8,229,791 | B2 | 7/2012 | Bradley et al. |
| 8,402,426 | B2 | 3/2013 | Alfandary et al. |
| 8,600,841 | B2 | 12/2013 | Cheng et al. |
| 8,892,241 | B2 * | 11/2014 | Weiss .................. B65G 1/1378 700/229 |
| 9,834,380 | B2 | 12/2017 | Hamilton et al. |
| 10,053,289 | B2 | 8/2018 | Hamilton et al. |
| 10,294,028 | B2 | 5/2019 | Hamilton et al. |
| 10,618,735 | B1 | 4/2020 | Oh et al. |
| 10,657,492 | B1 | 5/2020 | Wei et al. |
| 10,706,387 | B1 | 7/2020 | Cui et al. |
| 10,807,800 | B2 | 10/2020 | Hamilton et al. |
| 10,997,554 | B1 | 5/2021 | McMaster et al. |
| 11,137,742 | B2 | 10/2021 | Wise et al. |
| 11,345,546 | B2 | 5/2022 | Cacioppo et al. |
| 11,676,101 | B2 | 6/2023 | Kreis et al. |
| 2002/0069134 | A1 | 6/2002 | Solomon |
| 2004/0044557 | A1 | 3/2004 | Frech et al. |
| 2005/0060243 | A1 | 3/2005 | Whetman et al. |
| 2005/0075949 | A1 | 4/2005 | Uhrig et al. |
| 2008/0162298 | A1 | 7/2008 | Aliabadi et al. |
| 2009/0082902 | A1 | 3/2009 | Foltz et al. |
| 2009/0164343 | A1 | 6/2009 | Hurtis et al. |
| 2009/0319401 | A1 | 12/2009 | Rao et al. |
| 2013/0173049 | A1 | 7/2013 | Brunner et al. |
| 2014/0100715 | A1 | 4/2014 | Mountz et al. |
| 2014/0365258 | A1 | 12/2014 | Vestal et al. |
| 2015/0368044 | A1 | 12/2015 | Olson |
| 2016/0275428 | A1 | 9/2016 | Halbrook et al. |
| 2017/0158431 | A1 | 6/2017 | Hamilton et al. |
| 2017/0348857 | A1 | 12/2017 | Vasquez et al. |
| 2018/0084242 | A1 | 3/2018 | Rublee et al. |
| 2018/0218320 | A1 | 8/2018 | Lee et al. |
| 2019/0283252 | A1 | 9/2019 | Skaaksrud et al. |
| 2019/0325377 | A1 * | 10/2019 | Rajkhowa .............. G06Q 10/04 |
| 2019/0340561 | A1 | 11/2019 | Rajkhowa |
| 2020/0030967 | A1 * | 1/2020 | Goodwin, III ....... B65G 1/0492 |
| 2020/0094997 | A1 | 3/2020 | Menon et al. |
| 2020/0095001 | A1 | 3/2020 | Menon et al. |
| 2020/0279217 | A1 | 9/2020 | Gravelle et al. |
| 2020/0302391 | A1 * | 9/2020 | Li ........................ B65G 1/1378 |
| 2020/0310391 | A1 * | 10/2020 | Cole .................. G05B 19/4183 |
| 2020/0311644 | A1 | 10/2020 | Willard, III et al. |
| 2020/0357040 | A1 * | 11/2020 | Patel ..................... G06Q 10/087 |
| 2021/0019037 | A1 | 1/2021 | Treadway et al. |
| 2021/0049037 | A1 | 2/2021 | Kattepur et al. |
| 2021/0061566 | A1 * | 3/2021 | Cacioppo ................. B25J 9/162 |
| 2021/0090106 | A1 | 3/2021 | Gu et al. |
| 2021/0110461 | A1 | 4/2021 | Wang et al. |
| 2021/0192660 | A1 | 6/2021 | Delgado et al. |
| 2021/0248548 | A1 | 8/2021 | Guhya |
| 2022/0048707 | A1 | 2/2022 | Matl et al. |
| 2022/0088778 | A1 | 3/2022 | Sun et al. |
| 2022/0092541 | A1 | 3/2022 | Cacioppo et al. |
| 2022/0179416 | A1 | 6/2022 | Cacioppo |
| 2022/0230125 | A1 | 7/2022 | Vedantam et al. |
| 2022/0306387 | A1 | 9/2022 | Roth |
| 2022/0315353 | A1 | 10/2022 | Sun et al. |
| 2022/0405669 | A1 | 12/2022 | Kreis et al. |
| 2022/0405705 | A1 | 12/2022 | Kreis et al. |
| 2023/0004156 | A2 | 1/2023 | Cacioppo et al. |

OTHER PUBLICATIONS

Rheude, "Kitting Process Flow in Fulfillment," Aug. 31, 2021, available at https://redstagfulfillment.com/kitting-process-flow-in-fulfillment/, 9 pages.
Electronic Fasteners, Inc., "What is Kitting? A look at the Order Fulfillment Strategy," Nov. 2, 2020, available at https://www.electronicfasteners.com/what-is-kitting-a-look-at-the-order-fulfillment-strategy/, 2 pages.
United States Patent and Trademark Office, "Advisory Action," issued in connection with U.S. Appl. No. 17/378,439, dated Jun. 13, 2023, 4 pages.
United States Patent and Trademark Office, "Non-Final Office Action," issued in connection with U.S. Appl. No. 17/378,439, dated Dec. 14, 2022, 29 pages.
Comand et al., "Optimization of a Kitting Line: A Case Study," MDPI, Robotics, published Aug. 7, 2019, 19 pages.
Pavlichenko et al., "KittingBot: A Mobile Manipulation Robot for Collaborative Kitting in Automotive Logistics," 15th International Conference on Intelligent Autonomous Systems (IAS-15), Jun. 2018, 15 pages.
Boudella et al., "Modeling kitting operations in a semi-robotic environment," 7th IESM Conference, Oct. 2017, 7 pages.
Bottin et al., "Sales Kit Automated Production: An Integrated Procedure for Setup Reduction in Case of High Products Variety," Applied Sciences, vol. 11, published Oct. 28, 2021, 15 pages.
Crosby et al., "Integrating Missing, Logistics, and Task Planning for Skills-Based Robot Control in Industrial Kitting Applications," Proceedings of the 34th Workshop of UK Planning and Scheduling Special Interest Group, 2017, 7 pages.
Oracle Warehouse Management Cloud—User Guide—Release 20C, Oracle, 2020, 290 pages.
Quante, Rainer, "Management of Stochastic Demand in Make-to-Stock Manufacturing," Peter Lang Publishing, 2018, 134 pages.
Caputo et al., "A model for kitting operations planning," Assembly Automation, vol. 35, No. 1, 2015, 13 pages.
Interlake Mecalux, "Kitting: optimizing assembly in the warehouse," InterlakeMecalux.com, Dec. 22, 2020, 10 pages.
Ramaraj et al., "A Two-Stage Stochastic Programming Model for Production Planning in a Kitting Facility Under Demand and Yield Uncertainties," Proceedings of the 2017 Industrial Systems Engineering Conference, 2017, 7 pages.
United States Patent and Trademark Office, "Notice of Allowance and Fee(s) Due," issued in connection with U.S. Appl. No. 17/378,460, dated Dec. 8, 2022, 7 pages.
United States Patent and Trademark Office, "Corrected Notice of Allowability," issued in connection with U.S. Appl. No. 17/378,460, dated Feb. 8, 2023, 2 pages.
United States Patent and Trademark Office, "Final Office Action," issued in connection with U.S. Appl. No. 17/378,439, dated Mar. 24, 2023, 29 pages.
Zhang et al., "Dynamic pooling of make-to-stock and make-to-order operations," Int. J. Production Economics 144 (2013), pp. 44-56, available online Jan. 23, 2013, 13 pages.
Murby, "Inventory Control in a Hybrid Make-to-order-Make-to-stock Multiproduct Manufacturing System," Lund University LTH Faculty of Engineering, 2019, 131 pages.
Kaminsky et al., "Combined make-to-order/make-to-stock supply chains," IIE Transactions 41 (2009), pp. 103-119, 18 pages.
Simren, "Assemble to Order with Inventory Picks and Movements," Microsoft Dynamics NAV & 365 Business Central Blog, May 20, 2015, 12 pages.
Beemsterboer et al., "Hybrid MTO-MTS production planning: An explorative study," Elsevier, European Journal of Operational Research 248 (2016), pp. 453-461, available online Jul. 21, 2015, 9 pages.

(56) References Cited

OTHER PUBLICATIONS

Atan, et al., "Assemble-to-order systems: A review," European Journal of Operational Research 261 (2017), pp. 866-879, available online Feb. 24, 2017, 14 pages.

Microsoft Dynamics 365 Business Central: Assembly Management (Kitting) without the need of manufacturing functionality, Oct. 30, 2020, retrieved from the Wayback Machine at https://yzhums.com/4491/, 28 pages.

Soman, et al., "Comparison of dynamic scheduling policies for hybrid make-to-order and make-to-stock production systems with stochastic demand," Int. J. Production Economics 104 (2006), pp. 441-453, available online Oct. 12, 2004, 13 pages.

Microsoft Dynamics 365 Business Central Manual, 2019, 757 pages.

United States Patent and Trademark Office, "Notice of Allowance and Fee(s) Due," issued in connection with U.S. Appl. No. 17/378,460, dated Apr. 5, 2023, 5 pages.

United States Patent and Trademark Office, "Corrected Notice of Allowability," issued in connection with U.S. Appl. No. 17/378,460, dated May 5, 2023, 2 pages.

United States Patent and Trademark Office, "Non-Final Office Action," issued in connection with U.S. Appl. No. 17/378,439, mailed on Jul. 21, 2023, 22 pages.

United States Patent and Trademark Office, "Notice of Allowance," issued in connection with U.S. Appl. No. 17/378,439, dated Feb. 1, 2024, 17 pages.

United States Patent and Trademark Office, "Notice of Allowance and Fee(s) Due," issued in connection with U.S. Appl. No. 17/378,439, dated Jun. 20, 2024, 10 pages.

\* cited by examiner

SYSTEMS AND METHODS FOR DYNAMIC MANAGEMENT OF CONSOLIDATION ORDERS

RELATED APPLICATIONS

The present application claims the benefit of priority of U.S. Provisional Patent Application No. 63/211,479 filed Jun. 16, 2021, the entire contents of which are incorporated herein by reference.

TECHNICAL FIELD

Embodiments of the technology relate generally to systems and methods for dynamically managing order fulfillment and, more specifically, to managing missing items in a consolidation order.

BACKGROUND

Commerce is increasingly supported by complex systems of order fulfillment. The increase in electronic commerce, including on-line purchases and mail orders, has added to the complexity of order fulfillment. In order to efficiently and rapidly supply purchased items to purchasers, fulfillment management systems operated at fulfillment centers are used to optimize the gathering and shipping of items to purchasers. Fulfillment management systems can coordinate the work of human pickers and/or autonomous vehicles in the gathering of items for shipping.

SUMMARY

In one example embodiment, the present disclosure is directed to a computing system for managing exceptions to items collected for a consolidation order. The computing system can include a communication device and at least one processor in communication with the communication device. The at least one processor can be configured to receive, from a first autonomous vehicle via the communication device, an exception indicating a first item cannot be collected, where the first item is associated with a pick job assigned to the first autonomous vehicle. The at least one processor can be further configured to store, in response to receiving the exception, a short indicator associated with the first item. The at least one processor can determine, after storing the short indicator, that the first item can be collected and, in response thereto, store a resolvable short indicator associated with the first item. Lastly, the at least one processor can create, after storing the resolvable short indicator, a heal job that directs collection of the first item when the heal job satisfies a trigger condition, wherein the trigger condition is associated with at least one of a shipping cutoff and a size of the first item.

Example embodiments of the foregoing computing system can include one or more of the following features. The at least one processor can be further configured to transmit, via the communication device, the heal job to one of a plurality of autonomous vehicles, wherein the plurality of autonomous vehicles comprises the first autonomous vehicle. The pick job and the heal job can be associated with a consolidation order. In one example, satisfying the trigger condition comprises determining, by the at least one processor, that an estimated fulfillment time for the consolidation order equals or exceeds a threshold time associated with the shipping cutoff for the consolidation order.

In another example of the foregoing computing system, satisfying the trigger condition can comprise evaluating, by the at least one processor, the size of the first item and an available capacity of a storage container; and determining, by the at least one processor, that the size of the first item will fill a threshold portion of the storage container. The storage container can be positioned on one of a plurality of autonomous vehicles, wherein the plurality of autonomous vehicles comprises the first autonomous vehicle.

In another example of the foregoing computing system, satisfying the trigger condition can comprise evaluating, by the at least one processor, the size of the first item, a size of a second item, and an available capacity of a storage container; and determining, by the at least one processor, that the first item and the second item cannot fit in an available capacity of the storage container. Satisfying the trigger condition can further comprise evaluating, by the at least one processor, the size of the first item, a size of a third item, and an available capacity of a storage container; determining, by the at least one processor, that the first item and the third item can fit in an available capacity of the storage container; and including the third item with the first item in the heal job.

In another example of the foregoing computing system, satisfying the trigger condition can comprise evaluating, by the at least one processor, the size of the first item, a size of a second item, and an available capacity of a storage container; and determining, by the at least one processor, that the first item and the second item can fit in an available capacity of a storage container. Satisfying the trigger condition can further comprise evaluating, by the at least one processor, the size of the first item, the size of the second item, a size of a third item, and an updated available capacity of a storage container; determining, by the at least one processor, that the first item, the second item, and the third item can fit in the updated available capacity of the storage container; and including the second item and the third item with the first item in the heal job.

In another example embodiment, the present disclosure is directed to a method of managing exceptions associated with a consolidation order. The method can comprise receiving, from a first autonomous vehicle via a communication device, an exception indicating a first item cannot be collected, wherein the first item is associated with a pick job assigned to the first autonomous vehicle. The method can further comprise storing, by at least one processor in response to receiving the exception, a short indicator associated with the first item. Next, the method can comprise determining, by the at least one processor after storing the short indicator, that the first item can be collected and, in response thereto, storing a resolvable short indicator associated with the first item. Lastly, the method can comprise creating, by the at least one processor after storing the resolvable short indicator, a heal job that directs collection of the first item when the heal job satisfies a trigger condition, wherein the trigger condition is associated with at least one of a shipping cutoff and a size of the first item.

Example embodiments of the foregoing method can include one or more of the following features. The method can comprise transmitting, via the communication device, the heal job to one of a plurality of autonomous vehicles, wherein the plurality of autonomous vehicles comprises the first autonomous vehicle. The pick job and the heal job can be associated with a consolidation order. In one example, satisfying the trigger condition comprises determining, by the at least one processor, that an estimated fulfillment time for the consolidation order equals or exceeds a threshold time associated with the shipping cutoff for the consolidation order.

In another example of the foregoing method, satisfying the trigger condition can comprise evaluating, by the at least one processor, the size of the first item and an available capacity of a storage container; and determining, by the at least one processor, that the size of the first item will fill a threshold portion of the storage container. The storage container can be positioned on one of a plurality of autonomous vehicles, wherein the plurality of autonomous vehicles comprises the first autonomous vehicle.

In another example of the foregoing method, satisfying the trigger condition can comprise evaluating, by the at least one processor, the size of the first item, a size of a second item, and an available capacity of a storage container; and determining, by the at least one processor, that the first item and the second item cannot fit in an available capacity of the storage container. Satisfying the trigger condition can further comprise evaluating, by the at least one processor, the size of the first item, a size of a third item, and an available capacity of a storage container; determining, by the at least one processor, that the first item and the third item can fit in an available capacity of the storage container; and including the third item with the first item in the heal job.

In another example of the foregoing method, satisfying the trigger condition can comprise evaluating, by the at least one processor, the size of the first item, a size of a second item, and an available capacity of a storage container; and determining, by the at least one processor, that the first item and the second item can fit in an available capacity of a storage container. Satisfying the trigger condition can further comprise evaluating, by the at least one processor, the size of the first item, the size of the second item, a size of a third item, and an updated available capacity of a storage container; determining, by the at least one processor, that the first item, the second item, and the third item can fit in the updated available capacity of the storage container; and including the second item and the third item with the first item in the heal job.

In another example embodiment, the present disclosure is directed to a non-transitory computer-readable medium having instructions stored thereon that, when executed by one or more computer processors, cause the computer processors to perform operations. The operations can comprise receiving an exception indicating a first item cannot be collected, wherein the first item is associated with a pick job assigned to the first autonomous vehicle. The operations can further comprise storing a short indicator associated with the first item. Next, the operations can comprise determining that the first item can be collected and, in response thereto, storing a resolvable short indicator associated with the first item. Lastly, the operations can comprise creating, after storing the resolvable short indicator, a heal job that directs collection of the first item when the heal job satisfies a trigger condition, wherein the trigger condition is associated with at least one of a shipping cutoff and a size of the first item.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of the disclosed systems and methods and therefore are not to be considered limiting of the scope of this disclosure. The principles illustrated in the example embodiments of the drawings can be applied to alternate systems and methods. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

Figure 1A:
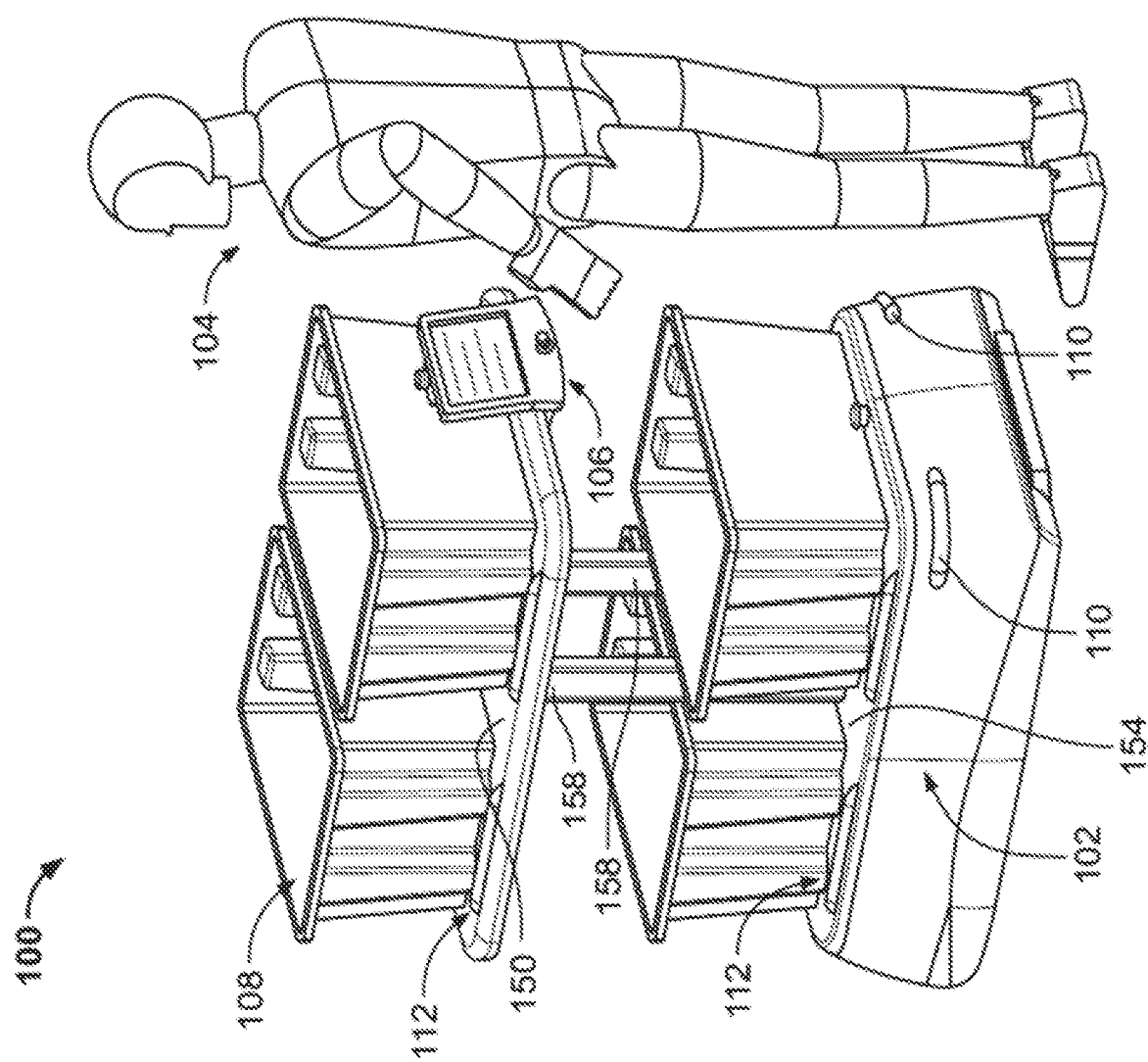
FIG. 1A is an illustration of an autonomous vehicle configured to collect items for an order in accordance with an example embodiment of the disclosure.

The example embodiments discussed herein are directed to systems and methods for managing the collection of items to fulfill customer orders. The fulfillment management system at a fulfillment center must consider a multitude of variables in optimizing the operation of the fulfillment center for efficiency. Variables the fulfillment management system can address include the numbers of available autonomous vehicles and workers, the availability of inventory to fulfill the received orders, the received orders and the corresponding dates on which the customers expect to receive their orders, the location of inventory within the fulfillment center, the routing of autonomous vehicles within the fulfillment center to collect items, the time required to collect items for an order, the packing of items for an order at a pack-out station, and cutoff times for providing a packed order to a courier for shipping of the packed order. Additionally, the fulfillment center often has service level agreements with merchants that require fulfillment of a certain number of orders each day.

Customer orders can include a single item, a few items, or a large number items. A customer order requiring items that will not fit within a single storage container on an autonomous vehicle is referred to as a consolidation order. When collecting items for a consolidation order, the items are placed in multiple storage containers and the multiple storage containers can be located on a single autonomous vehicle or spread across multiple autonomous vehicles. While the collection of the items for a consolidation order occurs across multiple storage containers, it is typically preferred that all of the items in a consolidation order be provided to the courier for shipping at the same time. In some cases, it is preferred that all of the items in a consolidation order be placed in a single shipping box at a pack-out station.

One challenge that fulfillment management systems seek to address is efficiently gathering and shipping consolidation orders involving multiple items. Managing the fulfillment of consolidation orders can be complex because the items needed to fulfill the consolidation order can be located in various locations, can have varying sizes, the availability of the items can be unpredictable, and the consolidation order may be subject to delivery time constraints. The complexity of consolidation orders can be a drain on the fulfillment center's resources, including the autonomous vehicles, the workers, and the computing systems that operate the fulfillment center. Accordingly, managing consolidation orders more effectively can reduce the energy consumed by the autonomous vehicles and can improve worker productivity. Additionally, reducing the number of consolidation orders that must be tracked and the duration during which they must be tracked until resolution can reduce the processing and memory demands on the computing systems used to operate the fulfillment center.

When an item of a consolidation order cannot be collected, an exception is generated and the fulfillment management system must determine an efficient method for resolving the exception so that the consolidation order can be completed. Because a consolidation order is spread across multiple storage containers, an exception introduces additional complexities for the fulfillment management system. Accordingly, fulfillment management systems that more effectively manage the gathering and shipping of consolidation orders would be beneficial.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Enhanced Cart System Used in Example Embodiments

FIG. 1A illustrates an enhanced cart system 100 that can be used in the example embodiments described herein. The enhanced cart system 100 includes an enhanced cart 102 (also referred to as a picking cart) that can be an autonomous vehicle, a semi-autonomous vehicle, or simply a wheeled cart that is moved by a worker 104. The enhanced cart system 100 can include a user interface 106 (e.g. a touch screen, a tablet device, a personal digital assistant, a scanning device, etc.), indicator lights 110, 112, and one or more audio speakers that assist the worker accompanying the enhanced cart system 100. The enhanced cart 102 can be propelled by a motor (e.g., an electric motor) that is coupled to a power source (e.g., a battery, a supercapacitor, etc.) that can be periodically recharged. Workers within a fulfillment center can use enhanced carts to move inventory within the fulfillment center. The workers can be humans, robots, or a combination of humans and robots. Workers can use enhanced carts for tasks such as picking, re-stocking, moving, sorting, counting, or verifying items. The term "item" is used herein broadly to encompass any product that may be gathered at a fulfillment center for shipping to a customer.

As illustrated in FIG. 1A, one or more storage containers 108 (also referred to as totes) may be placed on the enhanced cart 102 for containing items gathered throughout the fulfillment center. The gathering and placement of items into the storage containers 108 can be done by workers, can be automated by machines, or can be performed through a combination of workers and machines. The storage containers 108 are also removable from the enhanced cart 102, such as when the storage containers holding the gathered items arrive at a pack-out station for packing and shipping. In some cases, each storage container 108 can be used for a single order. In other cases, a storage container 108 can be used for batch picking where the container holds multiple complete or partial orders that are delivered to a post-pick station for sorting, processing, and packing. Hybrid approaches are possible in some cases where one storage container 108 on the enhanced cart 102 is for a single order while another storage container on the same enhanced cart 102 is used for batch picking. In some cases, the single order may be a time sensitive order, whereas the batch picking is associated with orders that are less time sensitive. In yet other cases, the storage containers 108 can be used for items that are to be counted or items that are to be moved or re-stocked within the fulfillment center.

Figure 1B:
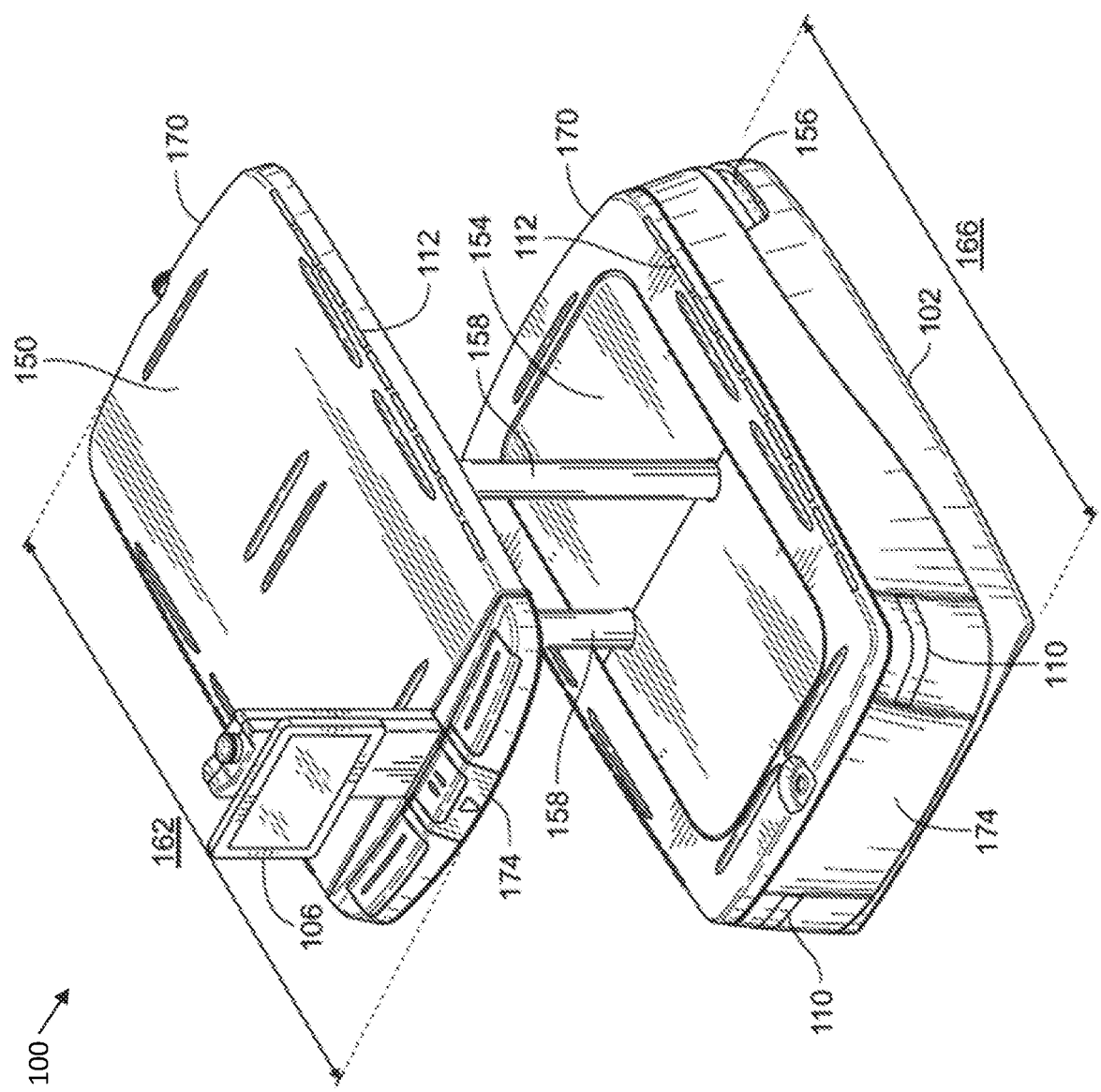
FIG. 1B is an illustration of another autonomous vehicle configured to collect items for an order in accordance with an example embodiment of the disclosure.

FIG. 1B illustrates another example of an enhanced cart system 100, but with the storage containers removed for purposes of illustration. As with the example of FIG. 1A, the enhanced cart system 100 of FIG. 1B includes an enhanced cart 102 having a user interface 106 and indicator lights 110, 112. The enhanced cart 102 of both FIGS. 1A and 1B can include upper and lower platforms 150, 154 on which the storage containers 108 can be placed. At least one support 158 can support the upper platform 150 above the lower platform 154. The at least one support 158 can be substantially centrally-located along the respective lengths 162, 166 of the upper and lower platforms 150, 154 between the front end 170 and back end 174 of the enhanced cart 102. As illustrated in FIG. 1B, the front end 170 of the enhanced cart 102 can define a recess 156. One or more sensors (e.g., light detecting and range detecting) can be housed within the recess 156. The recess 156 permits the one or more sensors to have a field of detection in front of and to the side of the enhanced cart 102.

The following discussion will describe the use of enhanced cart systems to efficiently manage the completion of consolidation orders within a fulfillment center. While the examples that follow refer to the specific example of an autonomous vehicle for the enhanced cart system, it should be appreciated that carts of varying complexity and features can be used in the described examples.

Fulfillment Management System

Figure 2:
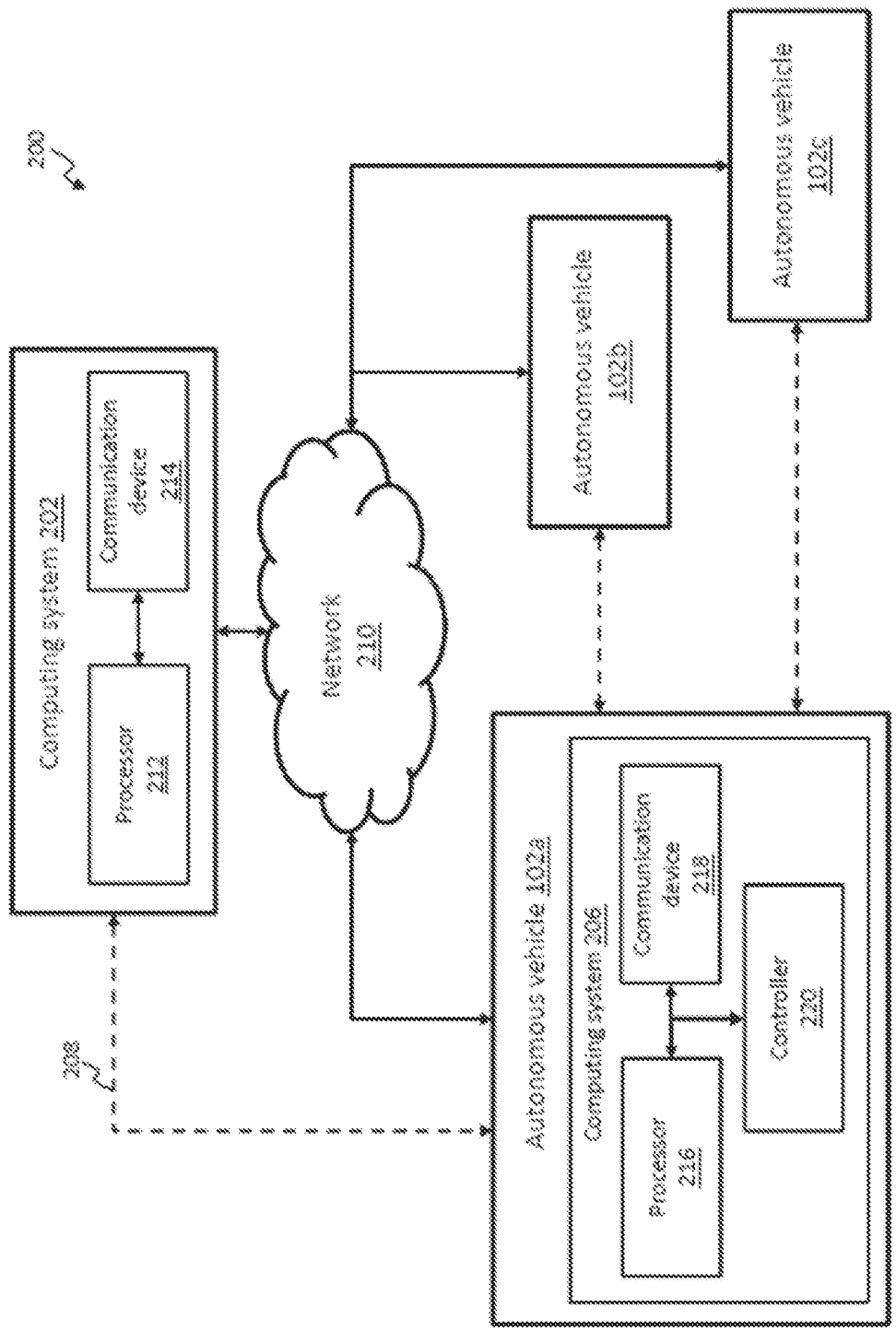
FIG. 2 is a block diagram of a system for managing order fulfillment in accordance with an example embodiment of the disclosure.

FIG. 2 illustrates a block diagram of a fulfillment management system 200 configured to manage orders within one or more fulfillment centers. The fulfillment management system 200 can receive customer orders from an order processing system. Alternatively, the fulfillment management system can be a part of the order processing system. The order processing system can receive orders from customer devices (e.g. phones, smartphones, computers) or from e-commerce computing systems. The order processing system can organize orders for fulfillment by identifying the availability at the fulfillment center of items within the order. The order processing system can also place orders and items in groupings, which can be referred to as pick jobs, for use in gathering the items from the fulfillment center.

The fulfillment management system 200 can include a computing system 202 configured to be coupled directly or indirectly to one or more autonomous vehicles 102a, 102b, and 102c (collectively referred to as 102) such as the autonomous vehicles described in connection with FIGS. 1A and 1B. In one example, the computing system 202 can communicate directly with the computing system 206 of an autonomous vehicle 102 via a communication channel 208. Additionally or alternatively, the computing system 202 can communicate with one or more autonomous vehicles 102 via a network device of network 210. In some embodiments, computing system 202 can communicate with a first autonomous vehicle (e.g., vehicle 102a) via a second autonomous vehicle (e.g. vehicle 102b).

The computing system 202 of the example fulfillment management system 200 can be located locally at the fulfillment center, can be located remotely from the fulfillment center (e.g., hosted in a cloud computing system), or can be distributed with components located both locally and remotely. As shown in FIG. 2, example computing system 202 can include a processor 212 that communicates with a communication device 214. The communication device 214 can receive messages from and transmit messages to the processor 212 and the autonomous vehicles 102. For example, messages sent to the autonomous vehicles 102 can include picking instructions (e.g., product name, product description, product image, quantity, location within the fulfillment center), navigation instructions, and shipping deadlines. Messages the autonomous vehicles 102 can transmit to the communication device 214 include confirmations when an item is picked or a pick job is complete and exception messages indicating that an item is not available for collection at a bin or shelf within the fulfillment center. The messages can be visual and/or audible and can be communicated using the user interface 106 and the indicator lights 110, 112.

The example system of FIG. 2 also illustrates certain components of example autonomous vehicle 102a. Example autonomous vehicle 102a can include a vehicle computer system 206 that comprises a vehicle processor 216, a vehicle communication device 218, and a vehicle controller 220. The vehicle communication device 218 can communicate with communication device 214 via channel 208 or via network 210. The vehicle processor 216 can process signals from the communication device 214, from the vehicle communication device 218, and from other components onboard the autonomous vehicle 102a such as light detecting or range detecting sensors. The vehicle controller 220 can send control signals to components onboard the autonomous vehicle 102a such as a navigation system that controls the movement of the autonomous vehicle 102a. As one example, the vehicle computer system 206 can receive a job from computing system 202, wherein the job identifies one or more items to be retrieved and locations for the one or more items within the fulfillment center. The vehicle controller 220 and the navigation system can use the location information associated with the one or more items to navigate the autonomous vehicle to the inventory location (e.g., bins or shelves) containing the one or more items. The other autonomous vehicles 102b, 102c can include components similar to those shown on autonomous vehicle 102a.

Heal Jobs for Consolidation Orders

As explained previously, consolidation orders are orders involving items that will not fit within a single storage container on the autonomous vehicle. A pick job for gathering the items identified in a consolidation order can be transmitted to an autonomous vehicle for completion. A worker can move through the fulfillment center with the autonomous vehicle and gather the items in the pick job from inventory locations, such as bins and/or shelves. As the items are gathered, they are placed in the storage containers on the autonomous vehicle. Situations where the worker is not able to gather an item associated with a consolidation order are referred to as an exception or a short. The worker may not be able to gather the item for a variety of reasons including, the item is not present at the location in the pick job, the item is out stock, the item is damaged, the item cannot be scanned, the item is too large to fit in the storage containers, and the worker cannot access the location of the item within the fulfillment center.

Given the numerous items in a consolidation order, if the worker encounters an item exception, the situation can present additional complexities for the fulfillment management system. These complexities can inefficiently consume the processing and memory resources of the fulfillment center's computing systems because more consolidation orders will need to be managed for a greater period of time. These complexities also can be a drain on the workers and autonomous vehicles of the fulfillment center in that additional inefficient trips throughout the fulfillment center for single items or a few items may be needed. Managing the fulfillment of consolidation orders involves a balance between meeting the shipping deadline for the order and completing the fulfillment of the order in an efficient manner. Favoring efficient fulfillment of the order too heavily may jeopardize the shipping deadline, but focusing too narrowly on the shipping deadline may degrade the overall efficiency of the fulfillment management system. In balancing these competing interests, the fulfillment management system can consider a variety of factors.

Figure 3:
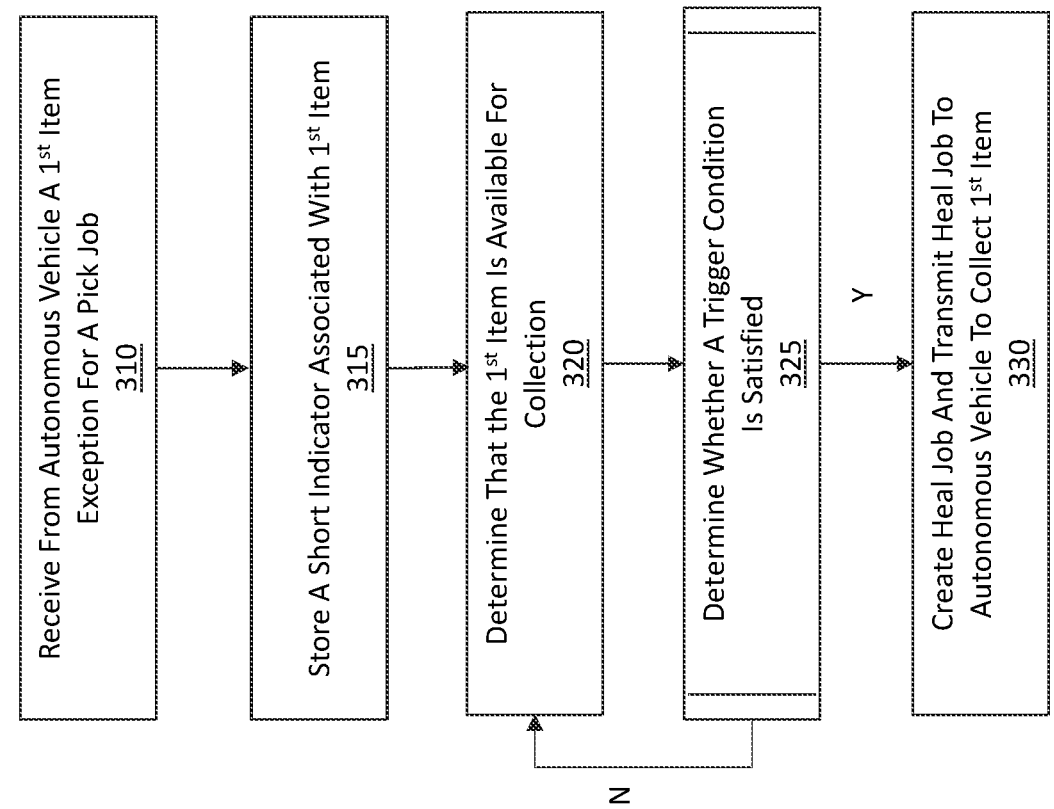
FIG. 3 is a flow chart illustrating a method for managing order fulfillment in accordance with an example embodiment of the disclosure.

Turning to FIG. 3, an example method 300 is illustrated that addresses the handling of an exception item associated with a consolidation order. The operations of example method 300 can be implemented as computer-readable instructions executed by computing system 202. It should be understood that in alternate embodiments certain operations of method 300 can be combined or other operations may be added to method 300.

In operation 310 of example method 300, the communication device 214 of computing system 202 may receive an indication (e.g., a signal, a notification, a message, etc.) of an exception for a first item associated with a pick job. The indication may be received via the user interface 106 and the vehicle communication device 218 onboard an autonomous vehicle 102. Alternatively, the computing system 202 may receive the indication from another computing system, such as an order processing system that determines the item is out of stock.

In operation 315 of example method 300, in response to receiving the indication of the exception for the first item, the computing system 202 can store in memory a short indicator associated with the first item. Storing the short indicator in memory allows the computing system 202 to identify items associated with the consolidation order that the worker has not been able to gather. The short indicator also allows the computing system 202 to monitor for opportunities to remedy the exception by gathering the first item.

Although the first item is not available for picking, the worker can proceed to pick other items associated with the consolidation order to make progress towards fulfilling the pick job. At a point in time after storing the short indicator in memory, the computing system 202 can determine that the first item has become available for picking in operation 320. For example, an additional source of the first item may have been identified at another location within the fulfillment center. When the computing system 202 determines that the first item has become available for picking, the computing system 202 can store in memory a resolvable short indicator associated with the first item. The resolvable short indicator allows the computing system 202 to identify items previously identified as exceptions that can now be remedied.

The computing system 202 remedies an exception item by creating a heal job to gather the item in order to make progress towards completing the consolidation order. Another term for a heal job is a resolution job. The heal job is another type of task transmitted to an autonomous vehicle for completion by a worker. The computing system 202 can periodically monitor items that have associated resolvable short indicators so that the computing system 202 can generate heal jobs. However, as explained previously, the computing system 202 can consider a variety of factors in deciding when to create the heal job. For example, creating heal jobs immediately after an exception item becomes available may assist in meeting a shipping deadline, but may also sacrifice efficiency of the fulfillment management system. On the other hand, waiting to create heal jobs to combine multiple exception items in the heal job may improve efficiency but may jeopardize the shipping deadline. Accordingly, trigger conditions that weigh these factors can be set with the computing system 202. In the example methods described herein, the trigger conditions can generally be categorized as associated with a shipping deadline or associated with a size of the item. However, in other embodiments, other types of trigger conditions can be employed.

In operation 325, the computing system 202 can determine whether a trigger condition is satisfied as a prerequisite to creating the heal job. Examples of trigger conditions will be described in greater detail in connection with FIGS. 4, 5, and 6. Once the computing system 202 determines that a trigger condition is satisfied, the computing system creates the heal job and transmits the heal job to an autonomous vehicle for gathering the first item in operation 330. Managing the trigger conditions allows for more efficient completion of heal jobs and the associated consolidation orders, which in turn reduces the overall time spent completing a pool of consolidation orders. Reducing the overall time spent completing consolidation orders reduces the duration and number of pending consolidation orders that must be managed by the fulfillment center's computing systems and optimizes the use of workers and autonomous vehicles.

Shipping Deadline Trigger

Figure 4:
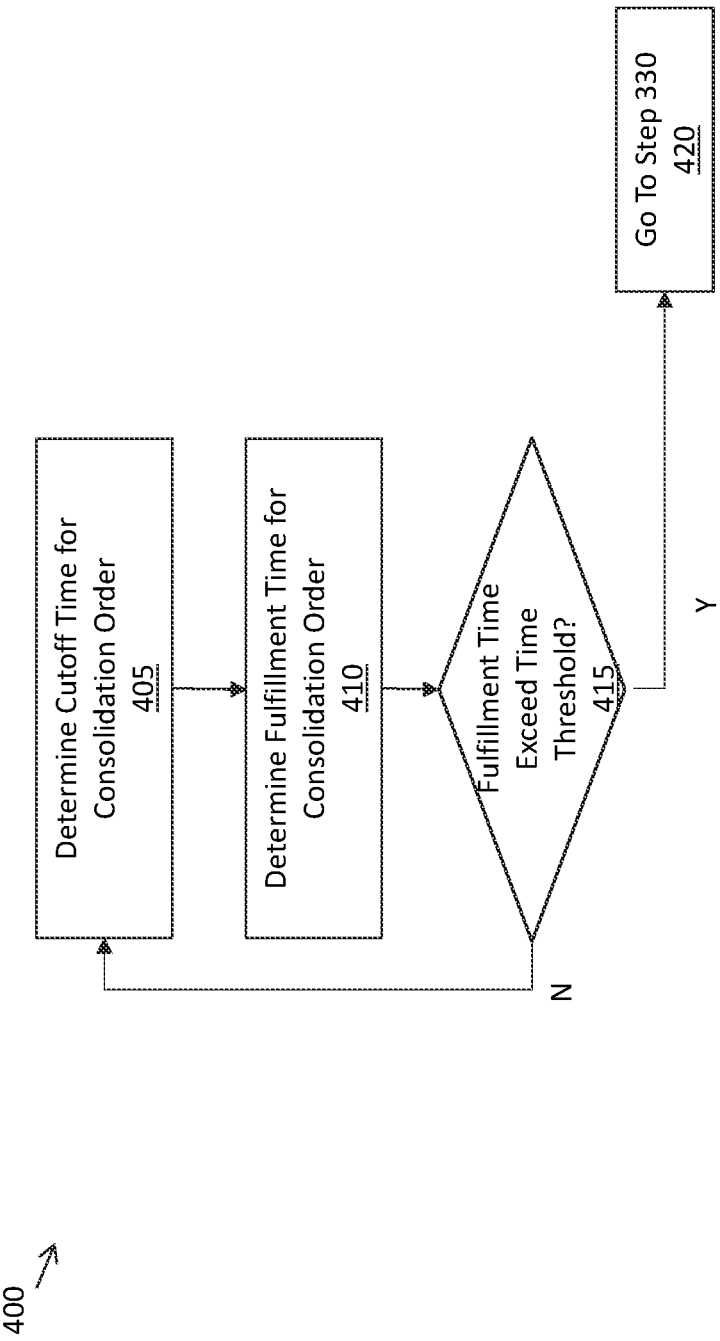
FIG. 4 is a flow chart illustrating a method for managing order fulfillment in accordance with an example embodiment of the disclosure.

FIG. 4 illustrates an example method 400 for determining whether a trigger condition is satisfied as referenced in operation 325 of example method 300. Example method 400 involves a trigger condition associated with a shipping deadline for the consolidated order. The operations of example method 400 can be implemented as computer-readable instructions executed by computing system 202. It should be understood that in alternate embodiments certain operations of method 400 can be combined or other operations may be added to method 400.

In operation 405, the computing system 202 can determine a shipping deadline or cutoff time for the consolidated order. The cutoff time can be an absolute deadline by which the consolidated order must be ready for shipping. Alternatively, the cutoff time may include a buffer that provides additional time before the consolidated order must be ready for shipping.

In operation 410, the computing system 202 determines an estimated fulfillment time for completing the consolidation order and having the consolidation order ready for shipping. The estimated fulfillment time can be computed based on a variety of factors, including but not limited to, the activity level of workers, the number of incoming orders, the average pick rate for the fulfillment center, whether the consolidation order has additional exception items, and to what extent all of the other items for the consolidation order have been gathered.

In operation 415, the computing system can determine whether the estimated fulfillment time exceeds the time remaining before the shipping cutoff time. If the estimated fulfillment time equals or exceeds the time remaining, the computing system 202 can proceed to operation 330 and create the heal job for sending to an autonomous vehicle. However, if the time remaining is not exceeded, the computing system can postpone the creation of the heal job until a more efficient opportunity arises for creating the heal job. In the case where the heal job is not created, the computing system 202 can periodically repeat example method 400 until the heal job for the exception item is created.

Item Size Trigger

Figure 5:
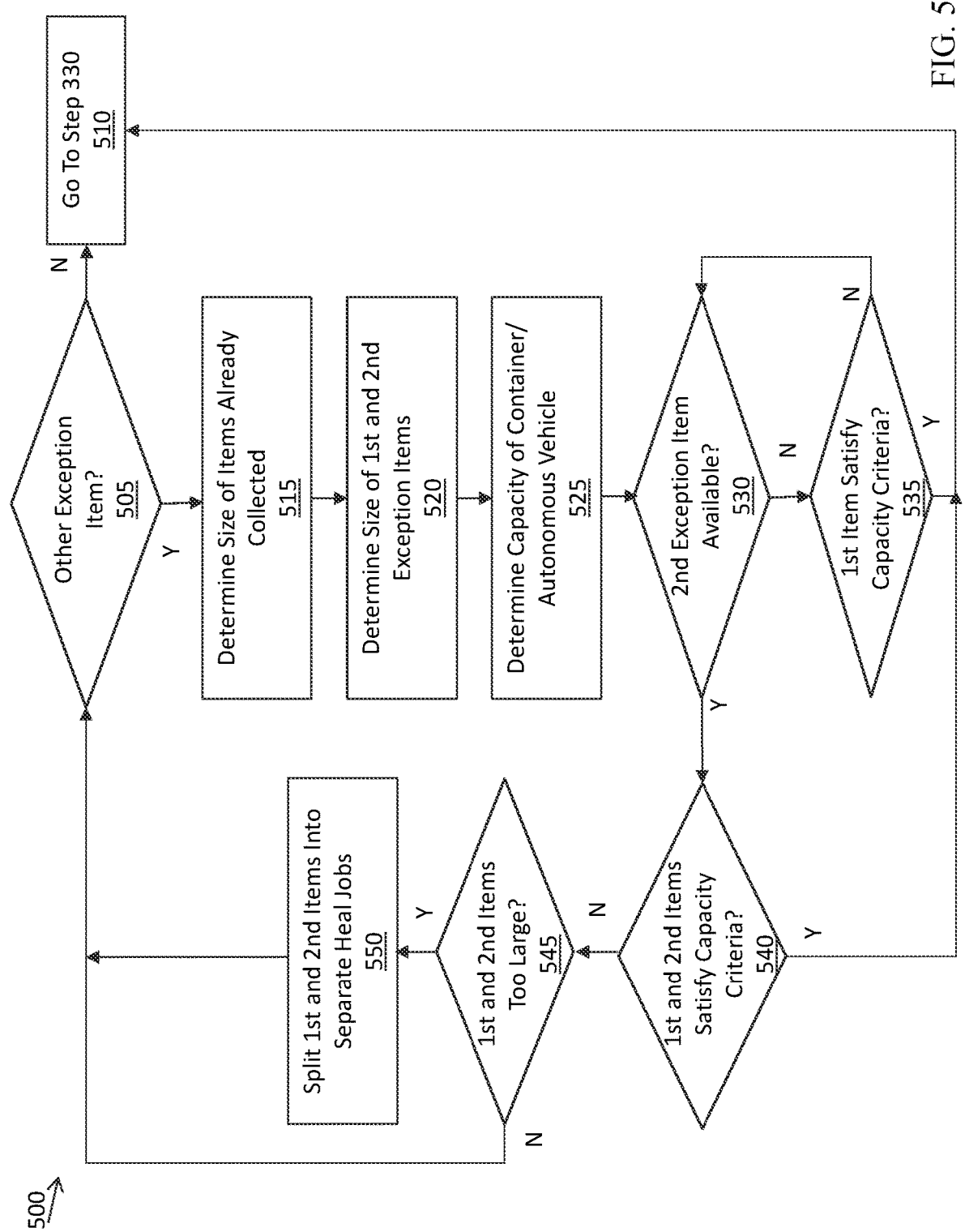
FIG. 5 is a flow chart illustrating a method for managing order fulfillment in accordance with an example embodiment of the disclosure.

FIG. 5 illustrates an example method 500 for determining whether a trigger condition is satisfied as referenced in operation 325 of example method 300. Example method 500 involves a trigger condition associated with the size of the exception item for the consolidated order. The operations of example method 500 can be implemented as computer-readable instructions executed by computing system 202. It should be understood that in alternate embodiments certain operations of method 500 can be combined or performed in a different sequence, or other operations may be added to method 500.

In operation 505, the computing system 202 can determine whether there is another exception item for the consolidation order in addition to the first item previously identified as an exception. If there are no other exception items associated with the consolidation order, there is no reason to delay creation of the heal job and the method proceeds to operation 510 where the computing system 202 creates and sends the heal job as previously described in connection with operation 330. However, if there is a second item exception, the computing system can assess whether the first item and the second item satisfy a capacity criteria associated with the storage container 108.

In operation 515, the computing system 202 can determine the sizes of the items in the pick job that have already been collected and placed in the storage container 108. Attributes such as a product's length, width, and height for the items in the pick job can be stored at the computing system 202 or in a database that is in communication with the computing system 202. Alternatively, the attributes of the items can be gathered by cameras in the fulfillment center or from a scan of the items performed by a worker.

In operation 520, the computing system 202 can use product attributes to determine the sizes of the first item and the second item that triggered exceptions. In operation 525, the computing system 202 can determine a remaining capacity of the storage container 108 based on known dimensions of the storage container and the sizes of the items that have already been collected and the sizes of the exception items that are to be collected. In certain embodiments, the computing system 202 can determine the available capacity for all of the storage containers 108 located on the autonomous vehicle 102.

In operation 530, the computing system 202 determines whether the second exception item is available to be collected. In other words, if the second exception item has a resolvable short indicator, then the second exception item is available for collection. If the second exception item does not have a resolvable short indicator, the example method 500 proceeds to operation 535 and the computing system 202 determines whether the first item satisfies a capacity criteria. The capacity criteria can be set to satisfy certain goals for efficiency. For example, if the first item is sufficiently large that it fills the remaining capacity of a storage container 108 to a certain threshold, then the capacity criteria can be satisfied and the example method 500 proceeds to operation 510 where the computing system 202 creates and transmits a heal job for the first item. As examples, the threshold for filling the storage container can be set at 75%, 85%, or 90% in order to minimize single trips by the autonomous vehicle for items that are small in size.

On the other hand, if in operation 535, the first exception item does not satisfy the capacity criteria, the example method can return to operation 530 where the computing system 202 can check periodically to determine when the second exception item becomes available. As an alternative to example method 500, if in operation 535 the first exception item does not satisfy the capacity criteria, the method can return to operation 505 where the computing system 202 determines whether there are additional exception items that might be grouped with the first item in order to satisfy the capacity criteria.

Returning to operation 530, if the computing system 202 determines that the second exception item has a resolvable short indicator, the method 500 proceeds to operation 540. In operation 540, the computing system 202 determines whether the first exception item and the second exception item in combination satisfy the capacity criteria associated with the storage container or storage containers located on the autonomous vehicle 102. If the combination of the first exception item and the second exception items satisfy the capacity criteria by filling the storage container or containers beyond the set threshold, the method 500 proceeds to operation 510 where the computing system 202 creates and transmits the heal job to the autonomous vehicle 102 to collect the first and second items.

In determining whether the capacity criteria is satisfied in operation 540, the computing system 202 can also determine whether the combination of the first and second items exceeds the capacity of the storage container or storage containers on the autonomous vehicle. If the storage capacity is not exceeded, the method 500 can proceed to operation 510 as previously described. However, if in operation 540, the computing system 202 determines that the combination of the first and second items does not satisfy the capacity criteria, the method 500 proceeds to operation 545 where the computing system 202 determines whether the combination of items is too large for the storage container(s). If the combination of the first and second items exceeds the capacity of the storage container(s), the method proceeds to operation 550 where the items are split into separate heal jobs. After splitting the items into separate heal jobs, the computing system 202 can return to operation 505 and the method 500 can be repeated if there are additional exception items that can be combined with the first item.

If in operation 545 the combination of the items is not too large, then the items must have been too small to fill the container(s) to the predetermined threshold and the method 500 proceeds to operation 505 where the computing system 202 ascertains whether there are additional exception items that can be combined with the first item and the second item. If there are additional exception items associated with the consolidation order that can be combined with the first and second exception items, the method 500 can repeat until the capacity criteria for the storage container(s) is satisfied.

By ascertaining whether there are additional exception items to combine with the first item and the second item, method 500 improves the efficiency of the fulfillment management system by minimizing the number of additional trips for the autonomous vehicle. When these efficiencies are multiplied by hundreds and thousands of pick jobs and heal jobs handled by the fulfillment management system, the savings in time and work hours for the workers and autonomous vehicles can be substantial. Applying these efficiencies over many consolidation orders also reduces the overall time that the number of consolidation orders are pending. Reducing the number and pendency of consolidation orders, which includes the item data associated with the consolidation orders, thereby optimizes the memory and processing resources of the computing systems for the fulfillment center.

Trigger Based on Item Size and Shipping Deadline

Figure 6:
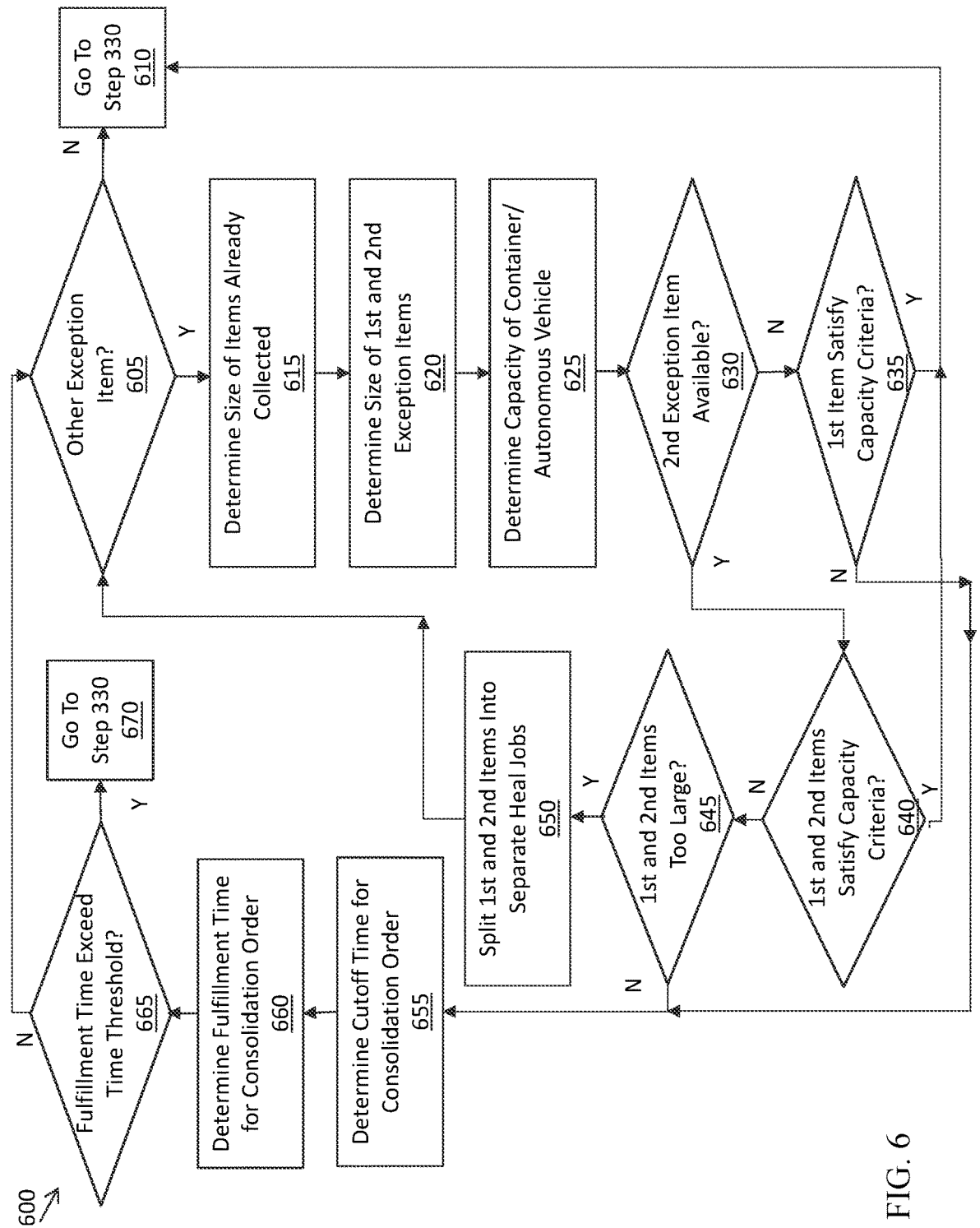
FIG. 6 is a flow chart illustrating a method for managing order fulfillment in accordance with an example embodiment of the disclosure.

FIG. 6 illustrates an example method 600 for determining whether a trigger condition is satisfied as referenced in operation 325 of example method 300. Example method 600 combines trigger conditions associated with item size and with a shipping deadline for the consolidated order. The operations of example method 600 can be implemented as computer-readable instructions executed by computing system 202. It should be understood that in alternate embodiments certain operations of method 600 can be combined or performed in a different sequence, or other operations may be added to method 600.

Because example method 600 combines the previously described triggers, operations 605 through 650 correspond to operations 505 through 550 of FIG. 5. Accordingly, the detailed description of operations 505 through 550 will not be repeated for operations 605 through 650. Method 600 differs from method 500 in that if the first item fails to satisfy the capacity criteria in operation 635 or the combination of the first and second items fails to satisfy the capacity criteria in operation 645, the method proceeds to operation 655. In operation 655 the computing system 202 considers cutoff time as an additional portion of the trigger condition. In operation 655, the computing system 202 determines the cutoff time in order for the consolidation order to meet its shipping deadline. In operation 660, the computing system determines the estimated fulfillment time for completing the consolidation order in preparation for shipping. The determinations performed by the computing system 202 in operations 655 and 660 can be similar to those described previously in connection with operations 405 and 410 of method 400.

Referring to operation 665, if the computing system 202 determines that estimated fulfillment time will exceed a time threshold and, therefore, meeting the shipping deadline is in jeopardy, the method proceeds to operation 670 where the computing system generates and transmits the heal job in accordance with operation 330 in order to expedite completion of the consolidated order. However, if in operation 665, the computing system 202 determines the estimated fulfillment time does not equal or exceed the threshold time before the shipping cutoff, the method can return to operation 605. By returning to operation 605, the cutoff time does not override the trigger condition and the computing system 202 will have additional time to identify additional exception items to add to the heal job to improve efficiency.

In an alternate embodiment to method 600, operations 655 through 670 can be performed before the other operations associated with the capacity criteria. In yet another embodiment of method 600, the computing system 202 could perform the cutoff time operations in parallel with the operations associated with the capacity criteria. By considering both the cutoff time and the capacity criteria, the fulfillment management system can improve efficiency while ensuring the shipping deadlines are not missed.

Computing Systems

In certain embodiments, some or all of the processing operations described in connection with the foregoing methods can be performed by computing systems such as a personal computer, a desktop computer, a centralized computer, or cloud computing systems. As explained previously, certain operations of the foregoing methods can be performed by a combination of computing systems.

Figure 7:
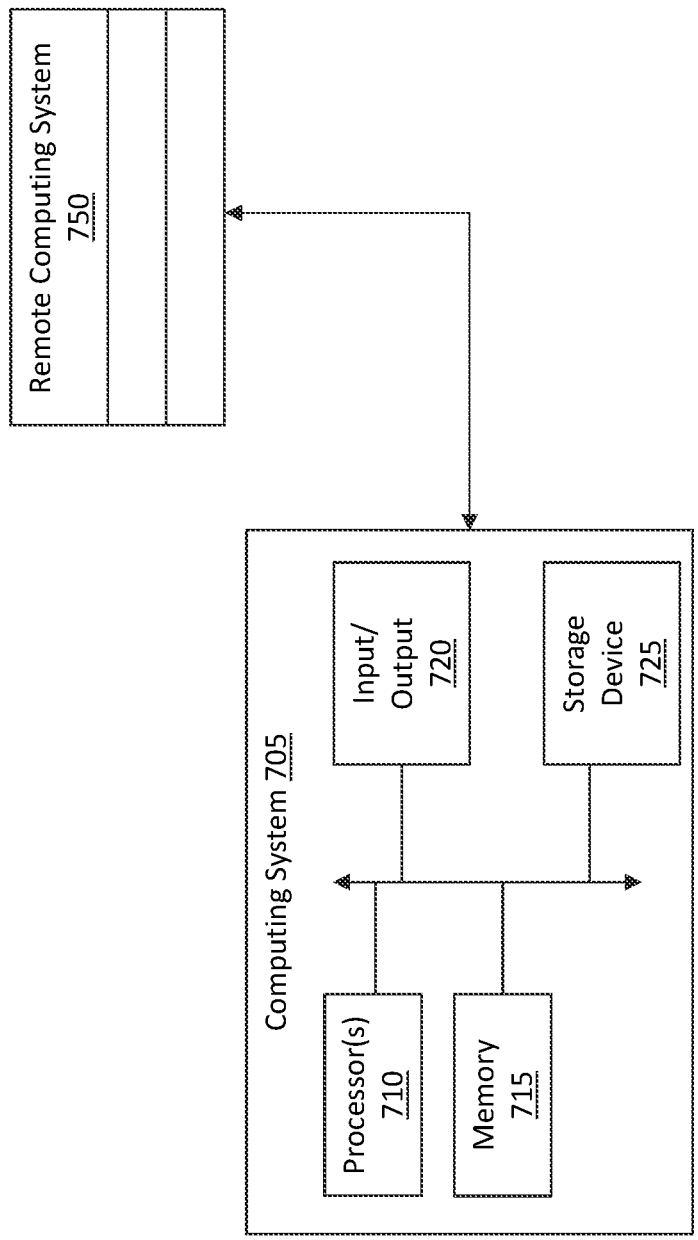
FIG. 7 is a block diagram of a computing system in accordance with an example embodiment of the disclosure.

Referring to FIG. 7, an example of a computing system is illustrated. The computing system 705 can represent a component of or one of the computing systems previously described herein, including a fulfillment management system, an order processing system, an e-commerce computing system, computing system 202, and vehicle computing system 206. Computing system 705 includes a processor 710, a memory 715, an input/output device 720, and a storage device 725. Each of the components of the computing system 705 can be interconnected, for example, by a system bus. The components of computing system 705 shown in FIG. 7 are not exhaustive, and in some embodiments, one or more of the components shown in FIG. 7 may not be included in an example system. Further, one or more components shown in FIG. 7 can be rearranged.

The processor 710 can be one or more hardware processors and can execute computer-readable instructions, such as instructions stored in memory 715. The processor 710 can be an integrated circuit, a central processing unit, a multi-core processing chip, an SoC, a multi-chip module including multiple multi-core processing chips, or other hardware processor in one or more example embodiments. The hardware processor is known by other names, including but not limited to a computer processor, a microprocessor, and a multi-core processor.

The memory 715 can store information including computer-readable instructions and data associated with the fulfillment center. The memory 715 can be cache memory, a main memory, and/or any other suitable type of memory. The memory 715 is a non-transitory computer-readable medium. In some cases, the memory 715 can be a volatile memory device, while in other cases the memory can be a non-volatile memory device.

The storage device 725 can be a non-transitory computer-readable medium that provides large capacity storage for the computing system 705. The storage device 725 can be a disk drive, a flash drive, a solid state device, or some other type of storage device. In some cases, the storage device 725 can be a database that is remote from the computing system 705. The storage device can store operating system data, file data, database data, algorithms, and software modules, as examples. In the case of the computing system 202, the storage device can store algorithms embodying the operations of the methods described herein. The storage device can also store data related to pick jobs, communications with the autonomous vehicles 102, and the performance of the fulfillment management system.

Lastly, the input/output device 720 provides an interface to other devices, such as a touch screen interface, and other computing systems such as remote computing system 750. The input/output device 720 can provide signal transfer links for communications with other devices and computing systems. The signal transfer links can include wired and/or wireless signal transfer links that transmit and receive communications via known communication protocols. For instance, the signal transfer links can provide wireless links to the autonomous vehicles 102. In some instances, the input/output device 720 can include a wired or wireless network interface device.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain operations of the methods may be performed in a different order, may be performed in parallel, or may be omitted. Moreover, in alternate embodiments additional operations may be added to the example methods described herein. Accordingly, the example methods provided herein should be viewed as illustrative and not limiting of the disclosure.

Terms such as "first" and "second" are used merely to distinguish one element or operation from another. Such terms are not meant to denote a preference or a particular order, and are not meant to limit the embodiments described herein. In the example embodiments described herein, numerous specific details are set forth in order to provide a more thorough understanding of the disclosure. However, it will be apparent to one of ordinary skill in the art having regard to the present application that the embodiments may be practiced without these specific details. In other instances, well-known features have not been described in detail to avoid unnecessarily complicating the description.

As used herein, the terms "a," "an," and "the" are intended to include plural alternatives, e.g., at least one. The phrase "and/or" means either or both. The terms "including", "with", and "having", as used herein, are defined as comprising (i.e., open language), unless specified otherwise.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Although embodiments described herein are made with reference to example embodiments, it should be appreciated by those skilled in the art having regard to the present application that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system comprising:
   a communication device; and
   machine-readable instructions; and
   at least one processor circuit in communication with the communication device, the at least one processor circuit to be programmed by the machine-readable instructions to:
   receive, via the communication device and based on one or more first signals transmitted by a first autonomous vehicle, a message including a first exception indicating a first item cannot be collected, the first item associated with a pick job assigned to the first autonomous vehicle;
   store, in a memory accessible by one or more of the at least one processor circuit and in response to receiving the message, a short indicator associating the first item with the first exception;
   determine, after storing the short indicator, that the first item can be collected and, in response thereto, store a first resolvable short indicator associated with the first item in the memory, the first resolvable short indicator identifying the first item as no longer associated with the first exception;
   determine, based on a second resolvable short indicator associated with a second item and stored in the memory, that the second item can be collected, the second item previously associated with a second exception indicating the second item could not be collected, the second resolvable short indicator identifying the second item as no longer associated with the second exception;
   perform a comparison of a size of the first item and a size of the second item relative to an available storage capacity of one or more autonomous vehicles, the one or more autonomous vehicles including the first autonomous vehicle;
   determine that a trigger condition for collection of the first item and the second item by an identified one of the one or more of the autonomous vehicles is satisfied based on the comparison;
   create a heal job that directs collection of the first item and the second item responsive to the trigger condition being satisfied; and
   control the identified one of the one or more autonomous vehicles based on one or more second signals transmitted to the identified one of the autonomous vehicles to cause the identified one of the one or more autonomous vehicles to perform the heal job, the one or more second signals including location information for use by the identified one of the one or more autonomous vehicles in navigating to the first item and the second item in an environment.

2. The system of claim 1, wherein the pick job and the heal job are associated with a consolidation order.

3. The system of claim 2, wherein one or more of the at least one processor circuit is to further determine that the trigger condition is satisfied by determining that an estimated fulfillment time for the consolidation order equals or exceeds a threshold time associated with a shipping cutoff for the consolidation order.

4. The system of claim 1, wherein one or more of the at least one processor circuit is to determine that the trigger condition is satisfied by:
   determining that the size of the first item and the size of the second item will fill a threshold portion of a storage container based on respective size attributes of the first item and the second item.

5. The system of claim 4, wherein the storage container is positioned on the one of the autonomous vehicles.

6. The system of claim 1, wherein one or more of the at least one processor circuit is to determine that the trigger condition is satisfied by:
   evaluating the size of the first item, the size of the second item, a size of a third item, and an available capacity of a storage container; and
   determining that the third item cannot fit in the available capacity of the storage container.

7. The system of claim 1, wherein one or more of the at least one processor circuit is to:
   evaluate the size of the first item, the size of the second item, a size of a third item, and an available capacity of a storage container;
   determine that the first item, the second item, and the third item can fit in the available capacity of the storage container; and
   associate the third item with the heal job.

8. The system of claim 1, wherein one or more of the at least one processor circuit is to determine that the trigger condition is satisfied by:
   evaluating the size of the first item, the size of the second item, and an available capacity of a storage container; and
   determining that the first item and the second item can fit in the available capacity of the storage container.

9. The system of claim 8, wherein one or more of the at least one processor circuit is to:
   evaluate the size of the first item, the size of the second item, a size of a third item, and an updated available capacity of the storage container, the updated available capacity of the storage container based on the first item and the second item in the storage container;
   determine that the first item, the second item, and the third item can fit in the updated available capacity of the storage container; and
   associate the third item with the heal job.

10. A method comprising:
receiving, via a communication device and based on one or more first signals transmitted by a first autonomous vehicle, a message including a first exception indicating a first item cannot be collected, the first item associated with a pick job assigned to the first autonomous vehicle;
in response to receiving the message, storing, by at least one processor circuit programmed by at least one instruction and in a memory accessible by one or more of the at least one processor circuit, a short indicator associating the first item with the first exception;
determining, by one or more of the at least one processor circuit after storing the short indicator, that the first item can be collected and, in response thereto, storing, by the one or more of the at least one processor circuit, a first resolvable short indicator associated with the first item in the memory, the first resolvable short indicator identifying the first item as no longer associated with the first exception;
determining, by one or more of the at least one processor circuit and based on a second resolvable short indicator associated with a second item and stored in the memory, that the second item can be collected, the second item previously associated with a second exception indicating the second item could not be collected, the second resolvable short indicator identifying the second item as no longer associated with the second exception;
performing, by one or more of the at least one processor circuit, a comparison of a size of the first item and a size of the second item relative to an available storage capacity of one or more autonomous vehicles, the one or more autonomous vehicles including the first autonomous vehicle;
determining, by one or more of the at least one processor circuit, that a trigger condition for collection of the first item and the second item by an identified one of the one or more autonomous vehicles is satisfied based on the comparison;
creating, by one or more of the at least one processor circuit, a heal job that directs collection of the first item and the second item responsive to the trigger condition being satisfied; and
controlling the identified one of the one or more autonomous vehicles based on one or more second signals transmitted to the identified one of the one or more autonomous vehicles to cause the identified one of the one or more autonomous vehicles to perform the heal job, the one or more second signals including location information for use by the identified one of the one or more autonomous vehicles in navigating to the first item and the second item in an environment.

11. The method of claim 10, wherein the pick job and the heal job are associated with a consolidation order.

12. The method of claim 11, further including determining that the trigger condition is satisfied by:
determining, by one or more of the at least one processor circuit, that an estimated fulfillment time for the consolidation order equals or exceeds a threshold time associated with a shipping cutoff for the consolidation order.

13. The method of claim 10, further including determining that the trigger condition is satisfied by:
determining, by one or more of the at least one processor circuit, that the size of the first item and the size of the second item will fill a threshold portion of a storage container.

14. The method of claim 13, wherein the storage container is positioned on the identified one of the one or more autonomous vehicles.

15. The method of claim 10, further including determining, by one or more of the at least one processor circuit, that the trigger condition is satisfied by:
the size of the first item, the size of the second item, a size of a third item, and an available capacity of a storage container; and
determining that the third item cannot fit in the available capacity of the storage container.

16. The method of claim 10, further including:
evaluating, by one or more of the at least one processor circuit, the size of the first item, the size of the second item, a size of a third item, and an available capacity of a storage container;
determining, by one or more of the at least one processor circuit, that the first item, the second item, and the third item can fit in the available capacity of the storage container; and
associating, by one or more of the at least one processor circuit, the third item with the heal job.

17. The method of claim 10, further including determining that the trigger condition is satisfied by:
evaluating, by one or more of the at least one processor circuit, the size of the first item, the size of the second item, and an available capacity of a storage container; and
determining, by one or more of the at least one processor circuit, that the first item and the second item can fit in the available capacity of the storage container.

18. The method of claim 17, further including:
evaluating, by one or more of the at least one processor circuit, the size of the first item, the size of the second item, a size of a third item, and an updated available capacity of the storage container, the updated available capacity of the storage container based on the first item and the second item in the storage container;
determining, by one or more of the at least one processor circuit, that the first item, the second item, and the third item can fit in the updated available capacity of the storage container; and
associating, by one or more of the at least one processor circuit, the third item with the heal job.

19. A non-transitory computer-readable medium comprising machine-readable instructions to cause at least one processor circuit to at least:
receive, via a communication device and based on one or more first signals transmitted by a first autonomous vehicle, a message including a first exception indicating a first item cannot be collected, the first item associated with a pick job assigned to the first autonomous vehicle;
store, in a memory and in response to receiving the message, a short indicator associating the first item with the first exception;
determine, after storing the short indicator, that the first item can be collected and, in response thereto, store a first resolvable short indicator associated with the first item in the memory, the first resolvable short indicator identifying the first item as no longer associated with the first exception;

determine, based on a second resolvable short indicator associated with a second item and stored in the memory, that the second item can be collected, the second item previously associated with a second exception indicating the second item could not be collected, the second resolvable short indicator identifying the second item as no longer associated with the second exception;

perform a comparison of a size of the first item and a size of the second item relative to an available storage capacity of one or more autonomous vehicles, the one or more autonomous vehicles including the first autonomous vehicle;

determine that a trigger condition for collection of the first item and the second item by an identified one of the one or more autonomous vehicles is satisfied based on the comparison;

create a heal job that directs collection of the first item and the second item responsive to the trigger condition being satisfied; and control the identified one of the one or more autonomous vehicles based on one or more second signals transmitted to the identified one of the one or more autonomous vehicles to cause the identified one of the one or more autonomous vehicles to perform the heal job, the one or more second signals including location information for use by the identified one of the one or more autonomous vehicles in navigating to the first item and the second item in an environment.

* * * * *